No. 731,746.

Patented June 23, 1903.

UNITED STATES PATENT OFFICE.

AUGUSTUS BISCHLER, OF BASLE, SWITZERLAND, ASSIGNOR TO THE FIRM OF BASLE CHEMICAL WORKS, OF BASLE, SWITZERLAND.

PROCESS OF MAKING SODIUM OXID.

SPECIFICATION forming part of Letters Patent No. 731,746, dated June 23, 1903.

Application filed October 25, 1902. Serial No. 128,821. (No specimens.)

*To all whom it may concern:*

Be it known that I, AUGUSTUS BISCHLER, chemist and doctor of philosophy, a subject of the Emperor of Russia, and a resident of Basle, Switzerland, have invented a new Process for the Manufacture of Sodium Oxid, of which the following is an exact, clear, and complete specification.

Holt and Sims are said to have obtained sodium oxid by letting a limited volume of oxygen or air act upon sodium heated to less than 180° centigrade. (*Journal of the Chem. Soc.*, 1894, page 440.) By repeating these experiments I was able to observe that when passing air over sodium heated to less than 180° centigrade the escaping air after a certain time ceases to carry off particles of sodium or of sodium peroxid. If after this time a weighed part of the reaction mass, which presents a grayish-white appearance, was dissolved in water and triturated with acids figures of more or less accordance with sodium oxid were obtained. In reality, however, the product of oxidation always consisted of a mixture of sodium peroxid and metallic sodium. According to my observations sodium peroxid is always formed when oxidizing sodium with air oxygen at not too high a temperature. If, on the contrary, the oxidation is performed at a very high temperature with a limited quantity of oxygen or air, oxid of sodium is obtained. It is according to this method that Beketow first produced pure sodium oxid. (*Berichte der Deutschen Chemischen Gesellschaft*, XVI, 1854.) But even apart from the fact that Beketow at last was obliged always to heat with blast, whereby according to my experience when heating in cast-iron vessels the iron begins to replace the sodium of the sodium oxid, his essays did not always produce the desired result, as he was obliged to fix the quantity of oxygen exactly in proportion to the sodium employed. I have now found that sodium oxid may easily be obtained by heating equivalent quantities of peroxid of sodium and sodium. For this purpose sodium is first oxidized completely or incompletely to sodium peroxid and then heated with the calculated quantity of sodium to over 400° centigrade. This may be performed either by adding the sodium, little by little, to the peroxid, heated to over 400° centigrade, or in the opposite way by slowly adding the peroxid to the heated sodium. I have further found that for the reduction of the sodium peroxid with sodium an addition of a few per cent. of caustic soda or caustic potash is of advantage, as the reaction is then more easily accomplished.

*Example—Production of sodium peroxid.—* Five kilos of sodium are first heated in a cast-iron vessel to about 200° centigrade, whereupon a current of air free from carbonic anhydrid and containing traces of moisture is passed over the sodium. As soon as the current of air carries off hardly any more sodium or sodium peroxid the temperature is slowly raised to about 400° centigrade. The oxidation proceeds more or less quickly according to the strength of the current of air. The reaction product—a yellow loose powder—is well mixed and titrated. If all the sodium is oxidized, the peroxid is reduced with five kilos of sodium in the manner described hereinafter; but should the peroxid still contain sodium a proportionately smaller quantity of sodium is used for the reaction.

*Production of sodium oxid.—*Five kilos of sodium with five hundred grams of dry caustic soda are heated to about 400° to 500° centigrade in a cast-iron vessel provided with a good stirring apparatus and being as far as possible alkali-proof, and then the peroxid produced from five kilos of sodium is slowly added while continually stirring. With violent reaction and strong heating the peroxid is reduced to oxid. After the peroxid has been added continue to heat for several hours and then leave to cool. The reaction product is pulverized with exclusion of moisture and then forms a reddish-yellow mass, this coloring probably arising from traces of iron oxid. If this product should still contain peroxid or too much metallic sodium, which may be seen by dissolving in water, it may eventually once more be heated.

The caustic soda may be omitted in the above example; but in that case the heating must be kept up for a longer time until the peroxid is completely reduced. The best way to proceed in this case is to take from five to ten per cent. more sodium for the reduction of the peroxid and toward the end of the operation to produce a vacuum in the vessel, so that the superfluous sodium is distilled off.

What I claim is—

1. A process for the manufacture of sodium oxid, by heating peroxid of sodium with sodium, the heating being effected *in vacuo* toward the end of the operation.

2. A process for the manufacture of sodium oxid, by heating peroxid of sodium with sodium to temperatures exceeding 400° centigrade.

3. A process for the manufacture of sodium oxid, by heating peroxid of sodium with sodium to temperatures exceeding 400° centigrade, the heating being effected *in vacuo* toward the end of the operation.

4. A process for the manufacture of sodium oxid, by heating peroxid of sodium with sodium with the addition of a small percentage of a caustic alkali.

5. A process for the manufacture of sodium oxid, by heating peroxid of sodium with sodium with an addition of a small percentage of a caustic alkali, up to a temperature exceeding 400° centigrade.

6. A process for the manufacture of sodium oxid, by heating peroxid of sodium with sodium, with an addition of a small percentage of a caustic alkali, up to a temperature exceeding 400° centigrade, the heating being effected *in vacuo* toward the end of the operation.

In witness whereof I have hereunto signed my name in the presence of two subscribing witnesses.

AUGUSTUS BISCHLER.

Witnesses:
 AMAND RITTER,
 ALBERT GRAELER.